United States Patent
Lee et al.

(10) Patent No.: US 9,537,983 B2
(45) Date of Patent: Jan. 3, 2017

(54) HOUSING OF A MOBILE DEVICE, NEAR FIELD COMMUNICATION TRANSCEIVER AND MOBILE DEVICE

(71) Applicants: Young-Ki Lee, Incheon (KR); Byeong-Taek Moon, Seoul (KR); Yo-Han Jang, Seoul (KR); Il-jong Song, Suwon-si (KR); Jae-Suk Lee, Suwon-si (KR); Byeong-Hoon Lee, Seoul (KR)

(72) Inventors: Young-Ki Lee, Incheon (KR); Byeong-Taek Moon, Seoul (KR); Yo-Han Jang, Seoul (KR); Il-jong Song, Suwon-si (KR); Jae-Suk Lee, Suwon-si (KR); Byeong-Hoon Lee, Seoul (KR)

(73) Assignee: Samsung Electronics Co., Ltd., Gyeonggi (KR)

( * ) Notice: Subject to any disclaimer, the term of this patent is extended or adjusted under 35 U.S.C. 154(b) by 0 days.

(21) Appl. No.: 14/842,938

(22) Filed: Sep. 2, 2015

(65) Prior Publication Data
US 2016/0134730 A1 May 12, 2016

(30) Foreign Application Priority Data
Nov. 12, 2014 (KR) .................. 10-2014-0156956

(51) Int. Cl.
*H04M 1/00* (2006.01)
*H04M 1/02* (2006.01)
*H01Q 1/00* (2006.01)
*H04M 1/725* (2006.01)
*H04W 88/06* (2009.01)

(52) U.S. Cl.
CPC ............... *H04M 1/026* (2013.01); *H01Q 1/00* (2013.01); *H04M 1/0249* (2013.01); *H04M 1/72575* (2013.01); *H04M 2201/08* (2013.01); *H04M 2250/04* (2013.01); *H04W 88/06* (2013.01)

(58) Field of Classification Search
CPC ...... H01Q 1/243; H01Q 1/2266; H04B 7/0602
USPC ...... 455/575.1, 575.7, 7, 13.3, 129; 343/702
See application file for complete search history.

(56) References Cited

U.S. PATENT DOCUMENTS

| | | | | |
|---|---|---|---|---|
| 8,639,303 B2* | 1/2014 | Allore | ............... | H01Q 1/243 455/575.1 |
| 8,736,495 B2 | 5/2014 | Cho | | |
| 8,947,303 B2* | 2/2015 | Golko | ................ | G06F 1/1698 343/702 |

(Continued)

FOREIGN PATENT DOCUMENTS

| | | |
|---|---|---|
| JP | 2011-142399 A | 7/2011 |
| KR | 101119607 B1 | 3/2012 |
| KR | 20130022208 A | 3/2013 |

*Primary Examiner* — Sonny Trinh
(74) *Attorney, Agent, or Firm* — Harness, Dickey & Pierce, P.L.C.

(57) ABSTRACT

A housing of a mobile device including a frame defining a perimeter of the mobile device, the frame including a first metal material and configured to operate as a first antenna for a first wireless communication, and a cover configured to cover one surface of the mobile device, the cover including a second metal material, and the cover and at least a portion of the frame configured to operate as a second antenna for a second wireless communication may be provided.

19 Claims, 11 Drawing Sheets

(56) References Cited

U.S. PATENT DOCUMENTS

| | | |
|---|---|---|
| 2011/0273341 A1 | 11/2011 | Han et al. |
| 2013/0078917 A1 | 3/2013 | Cho et al. |
| 2013/0234899 A1 | 9/2013 | Pope et al. |
| 2013/0234910 A1 | 9/2013 | Oh et al. |
| 2014/0065948 A1* | 3/2014 | Huang ................ H05K 5/0086 455/7 |
| 2014/0118198 A1 | 5/2014 | Kawashimo et al. |
| 2014/0139380 A1 | 5/2014 | Ouyang et al. |
| 2015/0009077 A1 | 1/2015 | Lee et al. |

* cited by examiner

HOUSING OF A MOBILE DEVICE, NEAR FIELD COMMUNICATION TRANSCEIVER AND MOBILE DEVICE

CROSS-REFERENCE TO RELATED APPLICATIONS

This U.S. non-provisional application claims the benefit of priority under 35 U.S.C. §119 to Korean Patent Application No. 10-2014-0156956 filed on Nov. 12, 2014 in the Korean Intellectual Property Office (KIPO), the entire contents of which are incorporated by reference herein in their entireties.

BACKGROUND

1. Technical Field

Example embodiments relate generally to electronic devices and, more particularly, to housings of mobile devices, near field communication transceivers, and/or mobile devices.

2. Description of the Related Art

To perform a desired wireless communication (e.g., a near field communication (NFC), a radio frequency identification (RFID) communication, etc.) in a mobile device, such as a smart phone, or a tablet computer, a wireless communication chip (e.g., an NFC chip) is embedded in the mobile device, and an antenna for transmitting/receiving a signal from/to the wireless communication chip is attached to an inside of a housing of the mobile device (e.g., an inside of a cover of the mobile device). The housing can be formed of resin or plastic.

Recently, as the mobile device has become thinner, the strength of the resin housing has been reduced. Thus, a mobile device housing made of a metal material has been developed to compensate the reduction in strength. However, in the case where the mobile device housing (e.g., the cover of the mobile device) is made of the metal material, the antenna attached to the cover is shielded by the metal material, which hinders the wireless communication of the mobile device.

SUMMARY

Some example embodiments provide a housing of a mobile device that enables a wireless communication of the mobile device.

Some example embodiments provide a near field communication transceiver that performs a near field communication using the housing.

According to an example embodiment, a housing of a mobile device includes a frame defining a perimeter of the mobile device, the frame including a first metal material, and configured to operate as a first antenna for a first wireless communication, and a cover configured to cover at least one surface of the mobile device, the cover including a second metal material, and the cover and at least a portion of the frame configured to operate as a second antenna for a second wireless communication.

In some example embodiments, a frequency band used in the first wireless communication may be different from a frequency band used in the second wireless communication.

In some example embodiments, the first wireless communication may be a non-near field communication, and the second wireless communication may be a near field communication.

In some example embodiments, the frame and the cover may be portions of an integral body.

In some example embodiments, the cover may be detachably attached to the frame.

In some example embodiments, the frame may include a metal structure defining the perimeter of the mobile device, and having a slit defined therein at one side of the mobile device, an insulator in the slit, and a first terminal coupled to the metal structure, and being adjacent to the insulator.

In some example embodiments, the cover may include a metal region, an insulating region being adjacent to the one side of the mobile device, and a second terminal on the metal region, the second terminal being adjacent to the insulating region such that the insulating region is between the first terminal and the second terminal.

In some example embodiments, the housing may be configured to perform the second wireless communication by using a signal path formed around the insulating region.

In some example embodiments, the signal path may be provided along the first terminal, a portion of the metal structure, a portion of the metal region and the second terminal.

In some example embodiments, the cover may further include a magnetic sheet on at least a portion of the signal path.

In some example embodiments, the frame may further include at least one inductor or at least one low pass filter at the signal path.

In some example embodiments, the insulating region may include an opening at a region adjacent to the metal region.

In some example embodiments, the opening may exposes a camera module of the mobile device.

In some example embodiments, the opening may be one of a triangular shape, a rectangular shape, a polygonal shape having five or more sides, a circular shape, and an elliptical shape.

In some example embodiments, the frame may include a metal structure defining the perimeter of the mobile device, the metal structure being divided into first through third regions by first and second slits, the first slit between the first region and the second region, and the second slit between the second region and the third region, a first inductor at the first slit, the first inductor having a first end and a second end, the second end coupled to the second region of the metal structure, a second inductor at the second slit, the second inductor having a third end, and a fourth end, the third end coupled to the second region of the metal structure, and the fourth end coupled to the third region of the metal structure, and a first terminal coupled to the first end of the first inductor.

In some example embodiments, the cover may include a metal region, an insulating region adjacent to an one side of the mobile device, and a second terminal on the metal region, the second terminal being adjacent to the insulating region such that the insulating region is between the first terminal and the second terminal.

In some example embodiments, the housing may be configured to perform the second wireless communication by using a signal path provided along the first terminal, the first inductor, the second region of the metal structure, the second inductor, the third region of the metal structure, a portion of the metal region and the second terminal.

In some example embodiments, the frame may include a metal structure defining the perimeter of the mobile device, the metal structure being divided into first through third regions by first and second slits, the first slit between the first region and the second region, and the second slit between the second region and the third region, a first low pass filter at the first slit, the first low pass filter having a first end and a second end, the second end coupled to the second region of the metal structure, a second low pass filter at the second slit, the a second low pass filter having a third end and a fourth end, the third end coupled to the second region of the metal structure, and the fourth end coupled to the third region of the metal structure, and a first terminal coupled to the first end of the first low pass filter.

In some example embodiments, the cover may include a metal region, an insulating region adjacent to an one side of the mobile device, and a second terminal on the metal region, the second terminal being adjacent to the insulating region such that the insulating region is between the first terminal and the second terminal.

In some example embodiments, the housing may be configured to perform the second wireless communication by using a signal path provided along the first terminal, the first low pass filter, the second region of the metal structure, the second low pass filter, the third region of the metal structure, a portion of the metal region, and the second terminal.

In some example embodiments, the first low pass filter may include a first inductor having one end coupled to the first terminal and another end coupled to the second region of the metal structure, and a first capacitor having one end coupled to the first terminal and another end coupled to a ground voltage. The second low pass filter may include a second inductor having one end coupled to the second region of the metal structure and another end coupled to the third region of the metal structure, and a second capacitor having one end coupled to the third region of the metal structure and another end coupled to the ground voltage.

According to an example embodiment, a near field communication transceiver is in a housing of a mobile device. The near field communication transceiver is coupled to a first terminal and a second terminal, the first terminal is formed at a frame of the housing, the frame defining a perimeter of the mobile device, the second terminal is formed at a cover of the housing, the cover is configured to cover one surface of the mobile device. The near field communication transceiver is configured to at least one of transmit and receive a near field communication signal through at least a portion of the frame and at least a portion of the cover.

In some example embodiments, the near field communication transceiver may be coupled to the first terminal and the second terminal through an impedance matching circuit.

According to an example embodiment, a mobile device includes a housing including a frame and a cover, the frame defining a perimeter of the mobile device, the cover configured to at least one cover one surface of the mobile device, and a non-near field communication transceiver in the housing, the non-near field communication transceiver configured to at least one of transmit and receive a non-near field communication signal through the frame, and a near field communication transceiver configured to at least one of transmit and receive a near field communication signal through at least a portion of the frame and at least a portion of the cover.

In some example embodiments, the mobile device may further include a first impedance matching circuit coupled between the frame and the non-near field communication transceiver, and a second impedance matching circuit coupled between the housing and the near field communication transceiver.

According to an example embodiment, a housing of a mobile device includes a frame defining at least a part of a perimeter of the mobile device, the frame including a metal structure, the frame configured to operate as a first antenna for a first wireless communication, a first terminal connected to the metal structure of the frame, and a cover covered by the frame and configured to cover at least one surface of the mobile device, the cover including a metal region, an insulating region and a second terminal, the first terminal on the insulating region, the second terminal in the metal region adjacent to the first terminal, at least a portion of the cover and at least a portion of the frame configured to form a signal path between the first and second terminals to operate as a second antenna for a second wireless communication. The second wireless communication may have a range shorter than the first wireless communication.

In some example embodiments, the frame may include at least one slit defined therein, and one of at least one inductor and at least one low pass filter is provided in the at least one slit.

In some example embodiments, when the at least one inductor is provided in the at least one slit, the at least one inductor may be connected between the first terminal and the metal structure.

In some example embodiments, when the at least one low pass filter is provided in the at least one slit, the at least one low pass filter includes an inductor and a capacitor, and the inductor may be connected between the first terminal and the metal structure and the capacitor may be connected between the first terminal and a ground voltage.

In some example embodiments, the cover may further include a magnetic sheet, and the magnetic sheet may be on at least a portion of a signal path of the relatively short range wireless communication.

In some example embodiments, the housing further may include a metal pattern on the insulating region, and the first terminal is on the metal pattern.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
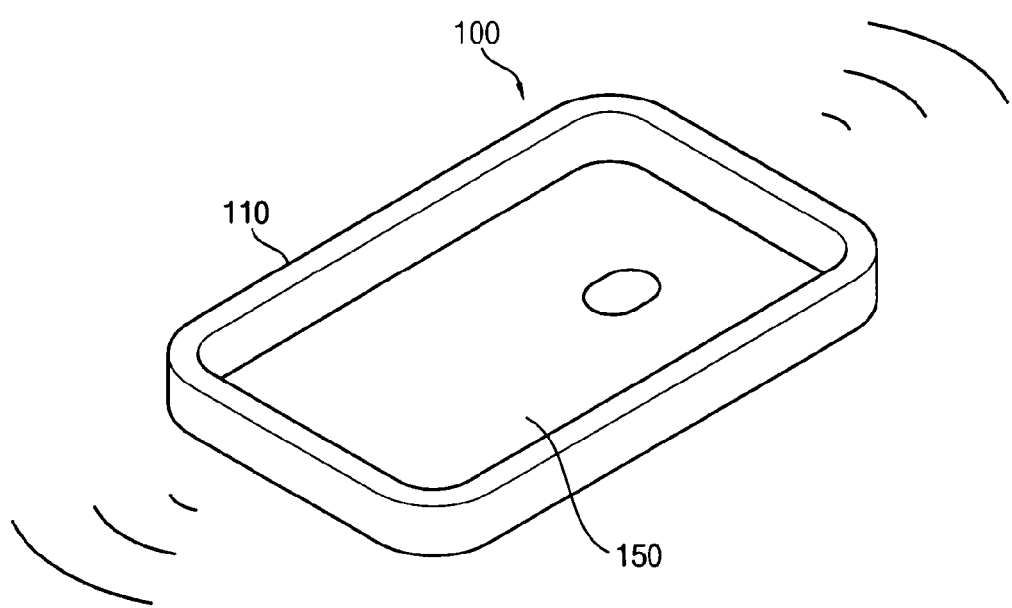
FIG. 1 is a diagram illustrating a housing of a mobile device according to example embodiments.

Various example embodiments will be described more fully hereinafter with reference to the accompanying drawings, in which some example embodiments are shown. The present inventive concepts may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concepts.

Unless otherwise defined, all terms (including technical and scientific terms) used herein have the same meaning as commonly understood by one of ordinary skill in the art to which this inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating a housing of a mobile device according to an example embodiment.

Referring to FIG. 1, a housing 100 of a mobile device includes a frame 110 defining a perimeter of the mobile device, and a cover 150 configured to cover one surface (e.g., a back surface) of the mobile device. According to some example embodiments, the housing 100 of the mobile device may be a cover of any mobile device, for example, a cellular phone, a smart phone, a tablet computer, a wearable device, a smart watch, smart glasses, a laptop computer, a personal digital assistant (PDA), a portable multimedia player (PMP), a digital camera, a music player, a portable game console, a navigation device, etc.

The frame 110 may form the perimeter (or a periphery) of the mobile device, and may support a display device (e.g., an organic light emitting diode (OLED) display device, a liquid crystal display (LCD) device, etc.) located at a front surface of the mobile device. Further, circuits, chips or devices may be embedded in the frame 110.

The frame 110 may include a first metal material having a desired strength and a desired electrical conductivity. For example, the first metal material may include at least one of copper (Cu), aluminum (Al), iron (Fe), titanium (Ti), silver (Ag), palladium (Pd), platinum (Pt), aurum (Au), nickel (Ni) and the like. Because at least a portion the frame 110 is formed of the first metal material, the housing 100 may have an improved strength and a good appearance.

The frame 110 including the first metal material may operate as a first antenna for a relatively long range wireless communication, a non-near field communication, or a far field communication (hereinafter, collectively referred to as "non-NFC"). For example, the non-NFC may include a cellular telephone communication (e.g., a long term evolution (LTE) communication, a wideband code division multiple access (WCDMA) communication, etc., a wireless local area network (WLAN) communication, a global positioning system (GPS) communication, a Bluetooth communication, or etc.).

The cover 150 may be disposed at the back surface of the mobile device that is opposite to the front surface of the mobile device at which the display device is disposed. In some example embodiments, the cover 150 may not be detached from the frame 110. For example, the housing 100 may have an integral structure where the frame 110 and the cover are integrally formed. In other examples, the frame 110 and the cover 150 may be separately formed, and then may be bonded to each other such that the cover 150 is not detached from the frame 110. In other example embodiments, the cover 150 may be detachably attached to the frame 110. For example, the cover may be detached from the frame 110 to change a battery of the mobile device, and may be attached to the frame 110 after the battery is changed.

The cover 150 may include a second metal material having a desired strength and a desired electrical conductivity. For example, at least a portion of the cover 150 may be formed of at least one of copper (Cu), aluminum (Al), iron (Fe), titanium (Ti), silver (Ag), palladium (Pd), platinum (Pt), aurum (Au), nickel (Ni) and the like. Because at least a portion the cover 150 is formed of the second metal material, the housing 100 may have an improved strength and a good appearance. According to some example embodiments, the first metal material of the frame 110 and the second metal material of the cover 150 may be the same metal material or different metal materials.

The cover 150 along with at least a portion of the frame 110 may operate as a second antenna for a relatively short range wireless communication or a near field communication (hereinafter, collectively referred to as "NFC"). A frequency band (e.g., above about 700 MHz) used in the non-NFC using the frame 110 as the first antenna may be different from a frequency band (e.g., about 13.56 MHz) used in the NFC using the cover 150 and the portion of the frame 110 as the second antenna.

In a conventional mobile device, a dedicated NFC antenna is attached to an inside of a cover of the conventional mobile device, or is formed on a battery of the mobile device. However, in the mobile device according to some example embodiments, the housing 100 including the frame 110 and the cover 150 may serve as the NFC antenna. Accordingly, the cover 150 may become thinner, thereby making the mobile device thinner. In the conventional mobile device at which the cover of the mobile device is formed of a metal material, the NFC antenna attached to the metal cover may be shielded by the metal cover, thereby distorting a signal (e.g., an electromagnetic wave or field) transmitted/received by the NFC antenna. However, in the mobile device according to some example embodiments, the metal cover 150 and the portion of the metal frame 110 may serve as the NFC antenna, and thus the NFC may be accurately performed without the signal distortion.

As described above, the housing 100 of the mobile device according to some example embodiments may include the frame 110 operating as the first antenna for the non-NFC, and the cover 150 operating as the second antenna for the NFC along with the portion of the frame 110. That is, the housing 100 of the mobile device according to some example embodiments may operate the antennas for the non-NFC and the NFC. Thus, although the housing 100 of the mobile device is formed of the metal material, the non-NFC and the NFC may be accurately performed without the signal distortion. Further, because dedicated antennas for the non-NFC and the NFC can be removed or reduced from the mobile device, the size and the cost of the mobile device may be reduced.

Figure 2:
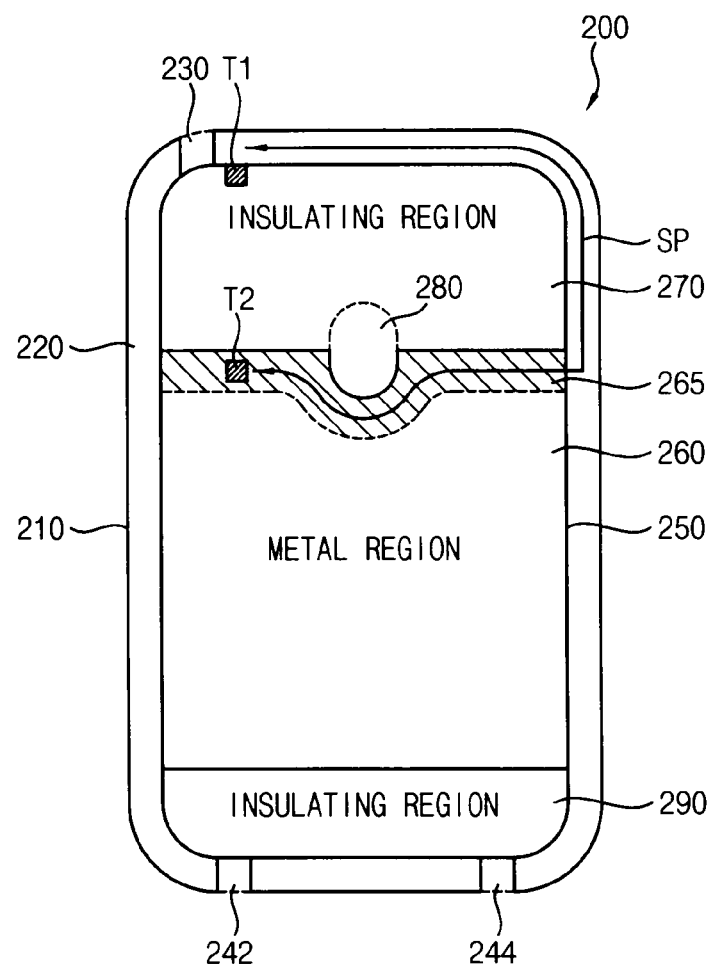
FIG. 2 is a diagram illustrating a housing of a mobile device according to an example embodiment.
Figure 3A:
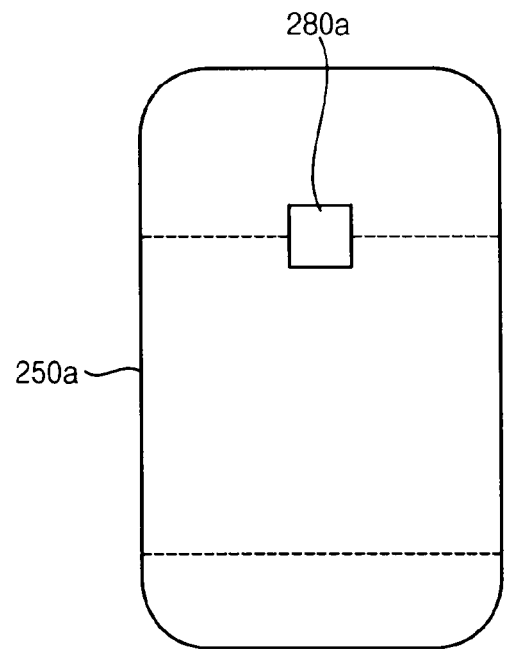
FIGS. 3A through 3D are diagrams illustrating examples of openings formed at a cover illustrated in FIG. 2.
Figure 3B:
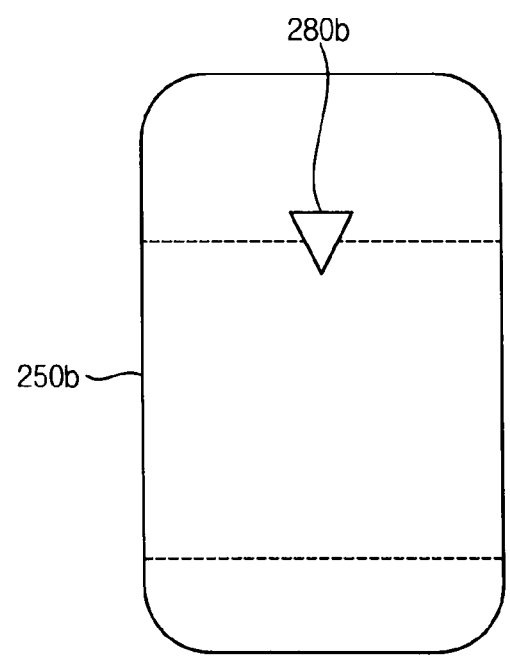
Figure 3C:
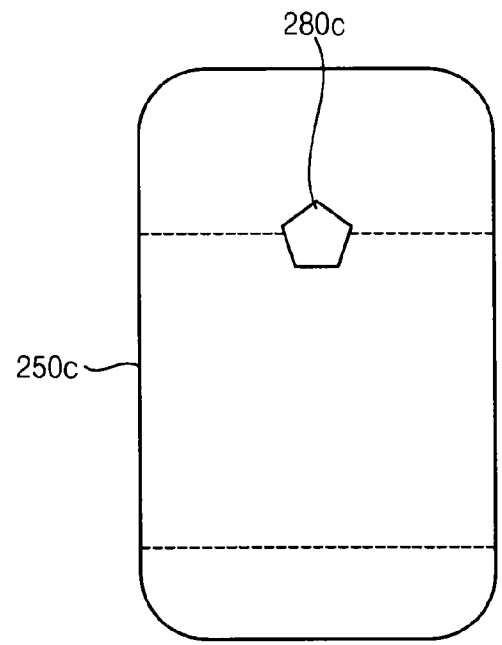
Figure 3D:
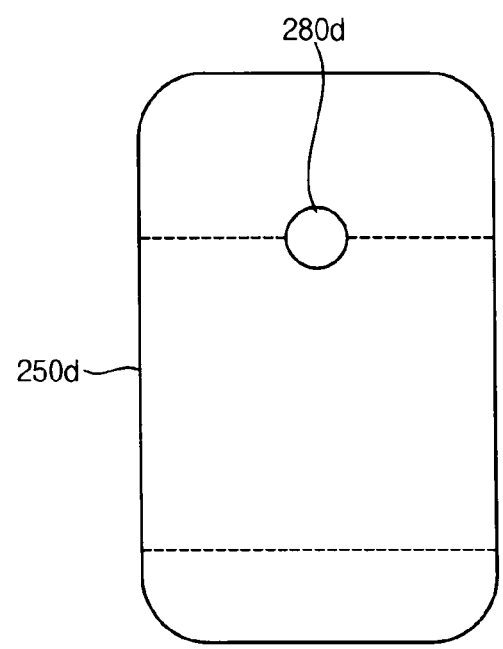
Figure 4:
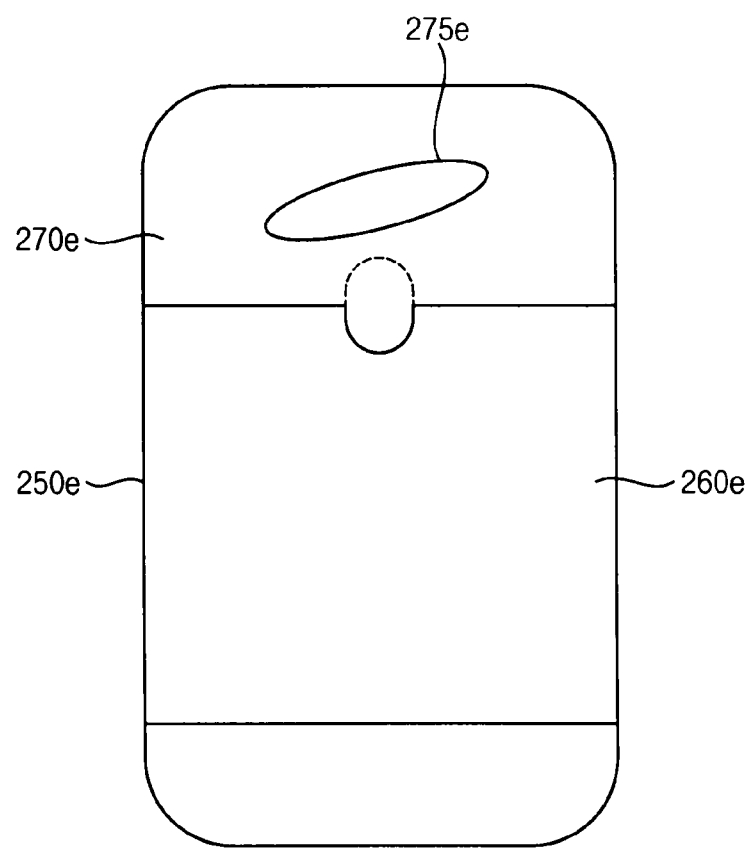
FIG. 4 is a diagram illustrating an example of a cover illustrated in FIG. 2.

FIG. 2 is a diagram illustrating a housing of a mobile device according to an example embodiment, FIGS. 3A through 3D are diagrams illustrating examples of openings formed at a cover illustrated in FIG. 2, and FIG. 4 is a diagram illustrating an example of a cover illustrated in FIG. 2.

Referring to FIG. 2, a housing 200 of a mobile device includes a frame 210 defining a perimeter of the mobile device, and a cover 250 configured to cover one surface (e.g., a back surface) of the mobile device.

The frame 210 may include a metal structure 220 defining the perimeter of the mobile device. The metal structure 220 may form a sidewall of the mobile device. The metal structure 220 may include a metal material, such as copper (Cu), aluminum (Al), iron (Fe), titanium (Ti), silver (Ag), palladium (Pd), platinum (Pt), aurum (Au), nickel (Ni), or the like. The metal structure 220 including the metal material may serve as an antenna for a non-near field communication (non-NFC), such as an LTE communication, a WCDMA communication, a WLAN communication, a GPS communication, a Bluetooth communication, etc. The metal structure 220 may have a slit 230 at a first side (e.g., an upper side) of the mobile device. In some example embodiments, the metal structure 220 may further have at least one slit 242 and 244 at a second side (e.g., a lower side, a left side or a right side) of the mobile device. According to example embodiments, positions, the number and widths of the slits 240, 242 and 244 may vary according to frequency bands of the non-NFC using the metal structure 220 of the frame 210 as the antenna.

The frame 210 may further include an insulator (or a dielectric) in the slit 230, 242 and 244. For example, the insulator may include a polyimide, a plastic, a polymer, a ceramic, a glass, or the like. The frame 210 may further include a first terminal T1 coupled to the metal structure 220 at the first side of the mobile device. The first terminal T1 may be located adjacent to the insulator at the first side of the mobile device.

The cover 250 may include a metal region 260, and a first insulating region 270 located adjacent to the first side (e.g., the upper side) of the mobile device. The cover 250 may further include a second terminal T2 on the metal region 260. The second terminal T2 may be located adjacent to the first insulating region 270. The metal region 260 of the cover 250 may include a metal material, such as copper (Cu), aluminum (Al), iron (Fe), titanium (Ti), silver (Ag), palladium (Pd), platinum (Pt), aurum (Au), nickel (Ni), or the like. The first insulating region 270 may include a polyimide, a plastic, a polymer, a ceramic, a glass, or the like. The first insulating region 270 may be located between the first terminal T1 and the second terminal T2.

Figure 5:
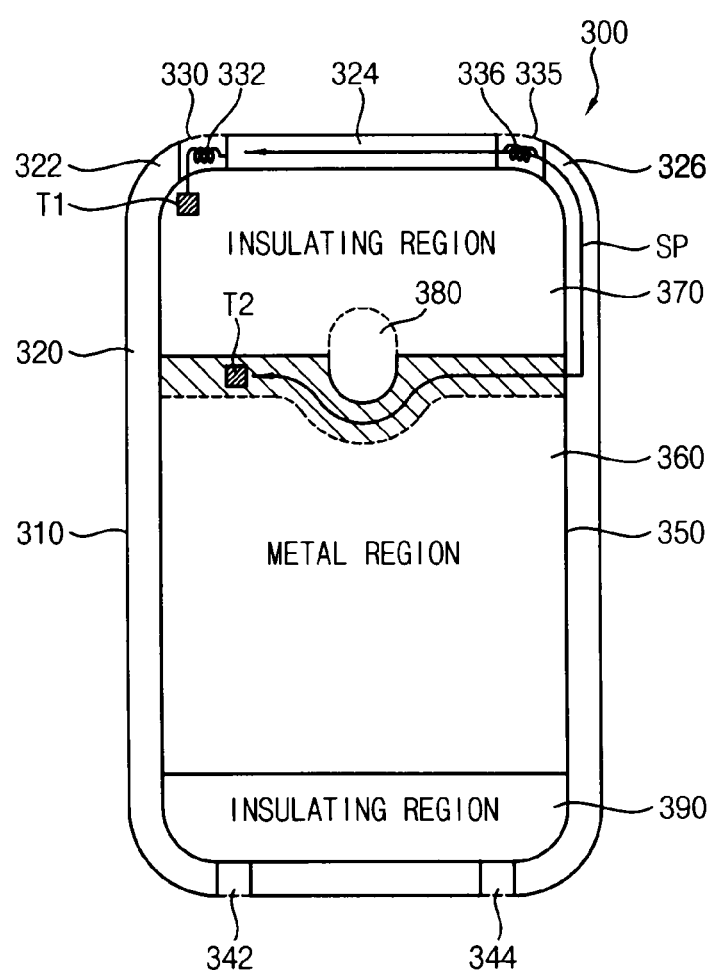
FIG. 5 is a diagram illustrating a housing of a mobile device according to an example embodiment.
Figure 6:
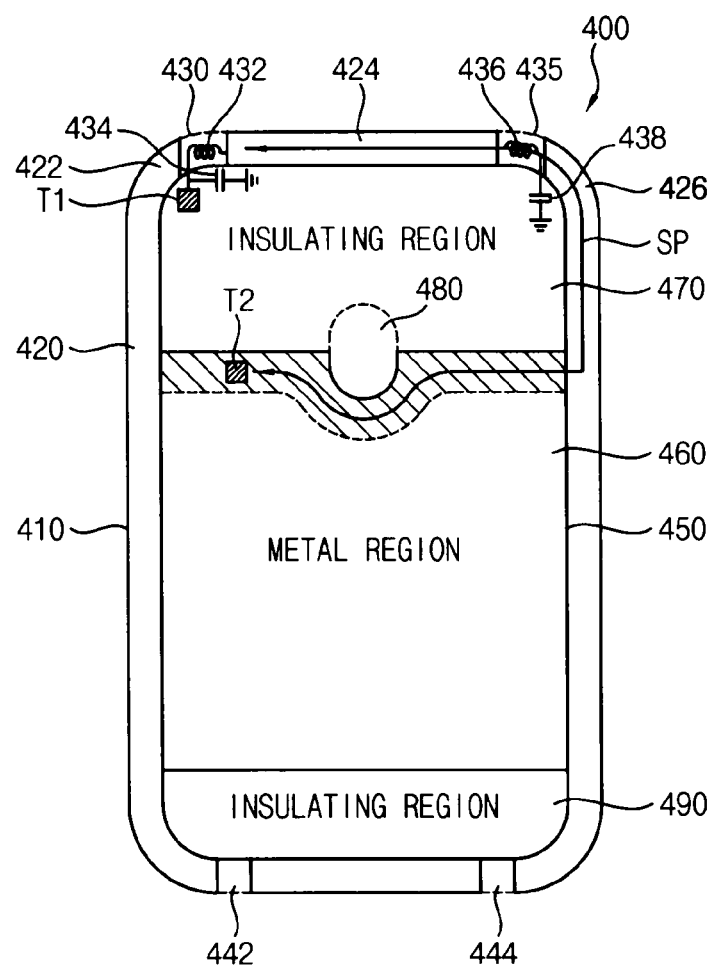
FIG. 6 is a diagram illustrating a housing of a mobile device according to an example embodiment.

A near field communication (NFC) may be performed using a signal path SP around the first insulating region 270. For example, as illustrated in FIG. 2, the signal path SP (e.g., a current path) provided along the first terminal T1, a portion of the metal structure 220 of the frame 210, a portion of the metal region 260 of the cover 250 and the second terminal T2 may be used as the antenna for the NFC. That is, the cover 250 and the frame 210 may operate as the antenna for the NFC, and thus a dedicated antenna for the NFC may not be desired. In some example embodiments, the frame 210 may further include at least one inductor formed at the signal path SP as illustrated in FIG. 5, or at least one low pass filter formed at the signal path SP as illustrated in FIG. 6. The inductor or the low pass filter formed at the signal path SP may block a signal component having a frequency other than an operating frequency (e.g., about 13.56 MHz) of the NFC, thereby reducing interference to the non-NFC using the frame 210.

In some example embodiments, the cover 250 may further include a magnetic sheet 265 located on at least a portion of the signal path SP. For example, the magnetic sheet 265 may be a ferrite sheet or a magneto-dielectric material (MDM)

sheet. The magnetic sheet 265 may improve electromagnetic wave (or field) radiation efficiency.

In some example embodiments, the first insulating region 270 of the cover 250 may include an opening 280 adjacent to the metal region 260. The opening 280 may expose a component of the mobile device. For example, the opening 280 may be a camera hole that exposes a camera module of the mobile device. According to some example embodiments, the opening 280 may have any shape, such as a triangular shape, a polygonal shape having five or more sides, a circular shape, an elliptical shape, or the like. For example, as illustrated in FIG. 2, the cover 250 may include the opening 280 having the elliptical shape. In another example, as illustrated in FIG. 3A, the cover 250a may include the opening 280a having the rectangular shape. In still another example, as illustrated in FIG. 3B, the cover 250b may include the opening 280b having the triangular shape. In still another example, as illustrated in FIG. 3C, the cover 250c may include the opening 280c having the polygonal shape having five or more sides. In still another example, as illustrated in FIG. 3D, the cover 250d may include the opening 280d having the circular shape.

In some example embodiments, another metal region may be formed inside the first insulating region 270 of the cover 250, the another metal region may be spaced apart from the metal region 260 where the signal path SP for the NFC is formed. For example, as illustrated in FIG. 4, a metal region 275e, which is spaced apart from the metal region 260e forming the signal path SP, may be formed inside the first insulating region 270e of the cover 250e. The metal region 275e may have a desired shape or pattern (e.g., a logo) to improve an appearance of the mobile device.

In some example embodiments, the cover 250 may further include a second insulating region 290 located adjacent to the second side (e.g., the lower side) of the mobile device.

As described above, in some example embodiments, the metal structure 220 of the frame 210 may be used as the antenna for the non-NFC. Further, the portion of the metal region 260 of the cover 250 and the portion of the metal structure 220 of the frame 210 may be used as the antenna for the NFC. That is, the housing 100 of the mobile device according to some example embodiments may serve as the antennas for both the non-NFC and the NFC. Thus, although the housing 200 of the mobile device is formed of the metal material, the non-NFC and the NFC may be accurately performed without the signal distortion. Further, because dedicated antennas for the non-NFC and the NFC are removed or reduced, the size and the cost of the mobile device may be reduced.

FIG. 5 is a diagram illustrating a housing of a mobile device according to an example embodiment.

Referring to FIG. 5, a housing 300 of a mobile device includes a frame 310 defining a perimeter of the mobile device, and a cover 350 configured to cover one surface (e.g., a back surface) of the mobile device. The housing 300 of FIG. 5 may have the same or similar configuration to the housing 200 of FIG. 2, except that the housing 300 further includes at least one inductor 332 and 336 located at a signal path SP.

The frame 310 may include a metal structure 320 defining the perimeter of the mobile device. The metal structure 320 may serve as an antenna for a non-NFC (e.g., an LTE communication, a WCDMA communication, a WLAN communication, a GPS communication, a Bluetooth communication, etc.). The metal structure 320 may have at least one slit 330, 335, 342 and 344. For example, the metal structure 320 may be divided into a first region 322, a second region 324 and a third region 326 by first and second slits 330 and 335 located at a first side (e.g., an upper side) of the mobile device. The first slit 330 may be located between the first region 322 and the second region 324, and the second slit 335 may be located between the second region 324 and the third region 326. In some example embodiments, the metal structure 320 may further have at least one slit 342 and 344 at a second side (e.g., a lower side) of the mobile device.

The frame 310 may further include at least one inductor 332 and 336 in the slit 330, 335, 342 and 344. For example, the frame 310 may include a first inductor 332 located at the first slit 330, and a second slit 336 located at the second slit 335. The first inductor 332 may have a first end coupled to a first terminal T1, and a second end coupled to the second region 324 of the metal structure 320. The second inductor 336 may have a third end coupled to the second region 324 of the metal structure 320, and a fourth end coupled to the third region 326 of the metal structure 320. The frame 310 may further include the first terminal T1 coupled to the first end of the first inductor 332.

The cover 350 may include a metal region 360, a first insulating region 370 located adjacent to the first side (e.g., the upper side) of the mobile device, and a second terminal T2 on the metal region 360. The first insulating region 370 may be located between the first terminal T1 and the second terminal T2. In some example embodiments, the cover 350 may further include an opening 380 at the first insulating region 370, and a second insulating region 390 located adjacent to the second side (e.g., the lower side) of the mobile device.

The first terminal T1 and the second terminal T2 may be coupled to an NFC transceiver, and a signal path SP for an NFC may be provided along the first terminal T1, the first inductor 332, the second region 324 of the metal structure 320 of the frame 310, the second inductor 336, the third region 326 of the metal structure 320 of the frame 310, a portion of the metal region 360 of the cover 350 and the second terminal T2. Accordingly, the signal path SP including the regions 324 and 326 of the frame 310 and a portion of the cover 350 may serve as an antenna (e.g., a loop antenna) for the NFC.

As described above, because at least one inductor 332 and 336 is disposed at the signal path SP for the NFC, a signal component having a frequency other than an operating frequency (e.g., about 13.56 MHz) of the NFC may be blocked or mitigated, thereby resulting in the reduction of interference to the non-NFC using the frame 310.

FIG. 6 is a diagram illustrating a housing of a mobile device according to an example embodiment.

Referring to FIG. 6, a housing 400 of a mobile device includes a frame 410 defining a perimeter of the mobile device, and a cover 450 configured to cover one surface (e.g., a back surface) of the mobile device. The housing 400 of FIG. 6 may have the same or similar configuration to the housing 200 of FIG. 2, except that the housing 400 further includes at least one low pass filter 432, 434, 436 and 438 located at a signal path SP.

The frame 410 may include a metal structure 420 defining the perimeter of the mobile device. The metal structure 420 may serve as an antenna for a non-NFC (e.g., an LTE communication, a WCDMA communication, a WLAN communication, a GPS communication, a Bluetooth communication, etc.). The metal structure 420 may have at least one slit 430, 435, 442 and 444. For example, the metal structure 420 may be divided into a first region 422, a second region 424 and a third region 426 by first and second slits 430 and 435 located at a first side (e.g., an upper side) of the mobile device. The first slit 430 may be located between the first region 422 and the second region 424, and the second slit 435 may be located between the second region 424 and the third region 426. In some example embodiments, the metal structure 420 may further have at least one slit 442 and 444 at a second side (e.g., a lower side) of the mobile device.

The frame 410 may further include at least one low pass filter 432, 434, 436 and 438 in the slit 430, 435, 442 and 444. For example, the frame 410 may include a first low pass filter 432 and 434 at the first slit 430, and a second low pass filter 436 and 438 at the second slit 435. The first low pass filter 432 and 434 may have a first end coupled to a first terminal T1, and a second end coupled to the second region 424 of the metal structure 420. The second low pass filter 436 and 438 may have a third end coupled to the second region 424 of the metal structure 420, and a fourth end coupled to the third region 426 of the metal structure 420. For example, the first low pass filter 432 and 434 may include a first inductor 432 having one end coupled to the first terminal T1 and another end coupled to the second region 424 of the metal structure 420, and a first capacitor 434 having one end coupled to the first terminal T1 and another end coupled to a ground voltage, and the second low pass filter 436 and 438 may include a second inductor 436 having one end coupled to the second region 424 of the metal structure 420 and another end coupled to the third region 426 of the metal structure 420, and a second capacitor 438 having one end coupled to the third region 426 of the metal structure 420 and another end coupled to the ground voltage. The frame 410 may further include the first terminal T1 coupled to the first end of the first low pass filter 432 and 434.

The cover 450 may include a metal region 460, a first insulating region 470 located adjacent to the first side (e.g., the upper side) of the mobile device, and a second terminal T2 on the metal region 460. The first insulating region 470 may be located between the first terminal T1 and the second terminal T2. In some example embodiments, the cover 450 may further include an opening 480 at the first insulating region 470, and a second insulating region 490 located adjacent to the second side (e.g., the lower side) of the mobile device.

The first terminal T1 and the second terminal T2 may be coupled to an NFC transceiver, and a signal path SP for an NFC may be provided along the first terminal T1, the first low pass filter 432 and 434, the second region 424 of the metal structure 420 of the frame 410, the second low pass filter 436 and 438, the third region 426 of the metal structure 420 of the frame 410, a portion of the metal region 460 of the cover 450 and the second terminal T2. Accordingly, the signal path SP including the regions 424 and 426 of the frame 410 and a portion of the cover 450 may serve as an antenna (e.g., a loop antenna) for the NFC.

As described above, because at least one low pass filter 432, 434, 436 and 438 is disposed at the signal path SP for the NFC, a signal component having a frequency other than an operating frequency (e.g., about 13.56 MHz) of the NFC may be blocked or mitigated, thereby resulting in the reduction of interference to the non-NFC using the frame 410.

Figure 7:
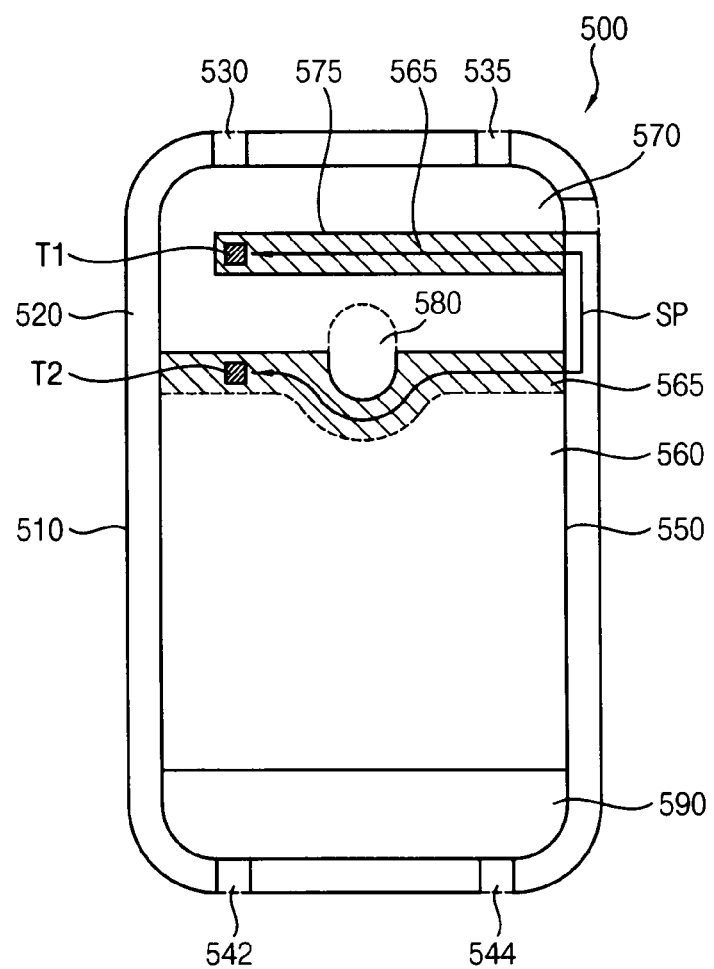
FIG. 7 is a diagram illustrating a housing of a mobile device according to an example embodiment.

FIG. 7 is a diagram illustrating a housing of a mobile device according to an example embodiment.

Referring to FIG. 7, a housing 500 of a mobile device includes a frame 510 defining a perimeter of the mobile device, and a cover 550 configured to cover one surface (e.g., a back surface) of the mobile device. The housing 500 of FIG. 7 may have the same or similar configuration to the housing 200 of FIG. 2, except that the housing 500 further includes at least one metal pattern 575 on which a first terminal T1 is formed.

The frame 510 may include a metal structure 520 defining the perimeter of the mobile device. The metal structure 520 may serve as an antenna for a non-NFC (e.g., an LTE communication, a WCDMA communication, a WLAN communication, a GPS communication, a Bluetooth communication, etc.). The metal structure 520 may have at least one slit 530, 535, 542 and 544.

The cover 550 may include a metal region 560, at least one insulting region 570 and 590, and a second terminal T2 on the metal region 560. Inside the insulting region 570, the cover 550 may further include at least one metal pattern 575 on which the first terminal T1 is formed. In some example embodiments, an opening 580 may be formed between the metal region 560 and the metal pattern 575.

The metal pattern 575 may be electrically coupled to the metal region 560 through a portion of the metal structure 520 of the frame 510, and the first terminal T1 and the second terminal T2 may be coupled to an NFC transceiver. Thus, a signal path SP for an NFC may be provided along the first terminal T1, the metal pattern 575, a portion of the metal structure 520 of the frame 510, a portion of the metal region 560 of the cover 550 and the second terminal T2. Accordingly, the signal path SP including a portion of the frame 510 and a portion of the cover 550 may serve as an antenna (e.g., a loop antenna) for the NFC. In some example embodiments, to improve electromagnetic wave (or field) radiation efficiency, the cover 550 may further include a magnetic sheet 565 located on at least a portion of the signal path SP. For example, the magnetic sheet 565 may be formed on the portion of the metal region 560 and the metal pattern 575.

Figure 8:
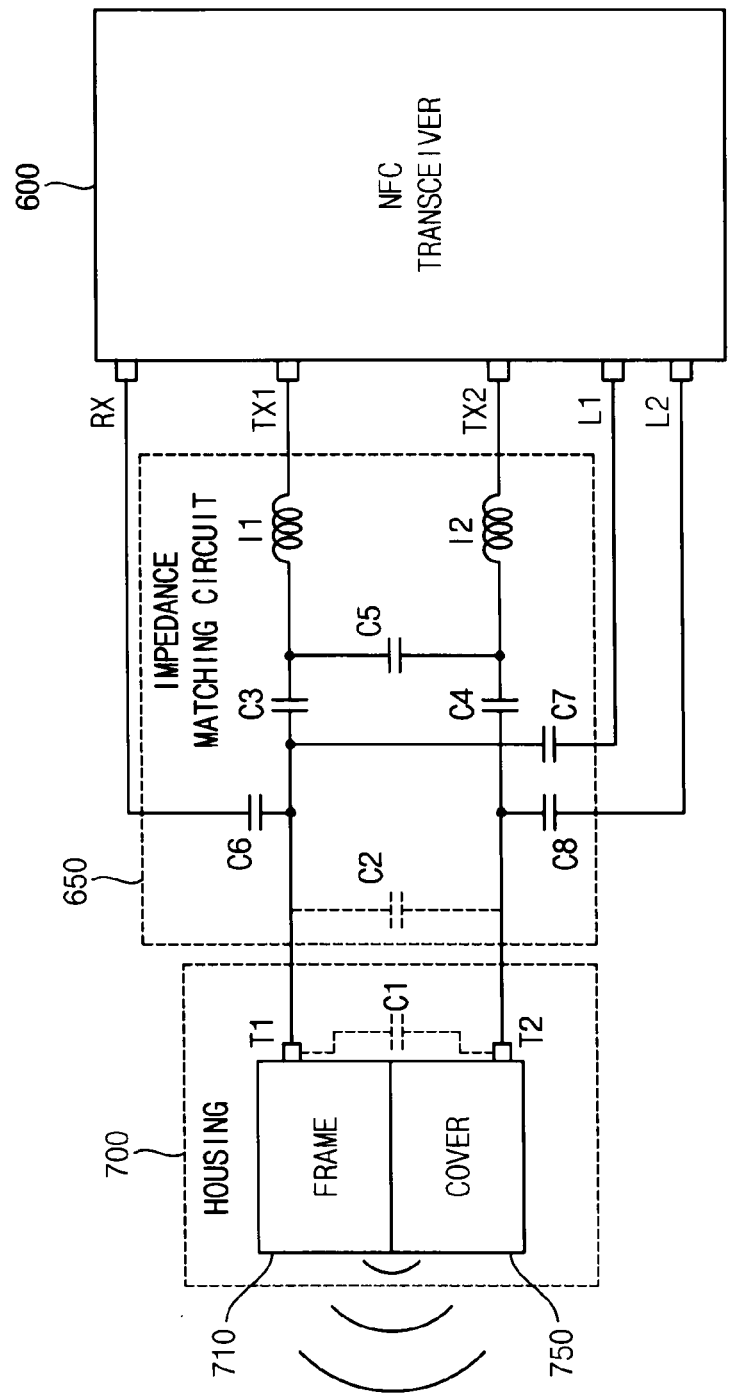
FIG. 8 is a block diagram illustrating a near field communication (NFC) transceiver coupled to a housing of a mobile device according to an example embodiment.

FIG. 8 is a block diagram illustrating a near field communication (NFC) transceiver coupled to a housing of a mobile device according to an example embodiment.

Referring to FIG. 8, an NFC transceiver 600 (or an NFC chip) may be installed within a housing 700 of a mobile device, and may transmit or receive an NFC signal using the housing 700 as an antenna for the NFC. According to some example embodiments, the housing 700 may be any one of the housings 200, 300, 400 and 500 illustrated in FIGS. 2, 5, 6 and 7. For example, the NFC transceiver 600 may be coupled to a first terminal T1 formed at a frame 710 of the housing 700 defining a perimeter of the mobile device, may be further coupled to a second terminal T2 formed at a cover 750 of the housing 700 configured to cover one surface (e.g., a back surface) of the mobile device, and may transmit or receive the NFC signal through at least a portion of the frame 710 and at least a portion of the cover 750.

As described above, the housing 700 including a metal material may serve as the antenna for the NFC performed by the NFC transceiver 600. In some example embodiments, the housing 700 may have an inductance and/or a capacitance by forming a signal path of a loop shape between the first terminal T1 and the second terminal T2, and thus may operate as a resonator having a desired resonance frequency suitable for the NFC. In some example embodiments, to allow the housing 700 to operate as the resonator having the desired resonance frequency, a first capacitor C1 may be formed between the first terminal T1 and the second terminal T2, and/or a second capacitor C2 may be formed in an impedance matching circuit 650. The NFC transceiver 600 and/or the impedance matching circuit 650 may be included in a mobile device. The mobile device may further include the housing 700.

The NFC transceiver 600 may perform a transmitting/receiving operation through first and second power terminals L1 and L2 in an NFC card mode. In an NFC reader mode, the NFC transceiver 600 may perform a transmitting operation through first and second transmitting terminals TX1 and TX2, and may perform a receiving operation through the receiving terminal RX.

In some example embodiments, the NFC transceiver 600 may be coupled to the first and second terminals T1 and T2 through an impedance matching circuit 650 that performs impedance matching. The impedance matching circuit 650 may be coupled to the first and second terminals T1 and T2 of the housing 700, and may be further coupled to terminals RX, TX1, TX2, L1 and L2 of the NFC transceiver 600. The impedance matching circuit 650 may perform the impedance matching between the NFC transceiver 600 and the antenna for the NFC (e.g., the housing 700).

In some example embodiments, the impedance matching circuit 650 may include a third capacitor C3, a fourth capacitor C4, a fifth capacitor C5, a sixth capacitor C6, a seventh capacitor C7, an eighth capacitor C8, a first inductor I1 and a second inductor I2. The third capacitor C3 may be coupled between the first terminal T1 of the housing 700 and a first node, the fourth capacitor C4 may be coupled between the second terminal T2 of the housing 700 and a second node, and the fifth capacitor C5 may be coupled between the first node and the second node. The first inductor I1 may be coupled between the first node and a first transmitting terminal TX1 of the NFC transceiver 600, and the second inductor I2 may be coupled between the second node and a second transmitting terminal TX2 of the NFC transceiver 600. The sixth capacitor C6 may be coupled between the first terminal T1 of the housing 700 and a receiving terminal RX of the NFC transceiver 600. The seventh capacitor C7 may be coupled between the first terminal T1 of the housing 700 and a first power terminal L1 of the NFC transceiver 600, and the eighth capacitor C8 may be coupled between the second terminal T2 of the housing 700 and a second power terminal L2 of the NFC transceiver 600. Although FIG. 8 illustrates an example of a configuration of the impedance matching circuit 650, the impedance matching circuit 650 may have any configuration for impedance matching between the housing 700 and the NFC transceiver 600.

As described above, the NFC transceiver 600 according to example embodiments may use the housing 700 as the antenna for the NFC without providing a dedicated antenna for the NFC. Accordingly, the size of the mobile device may be reduced, and a manufacturing cost may be reduced.

Figure 9:
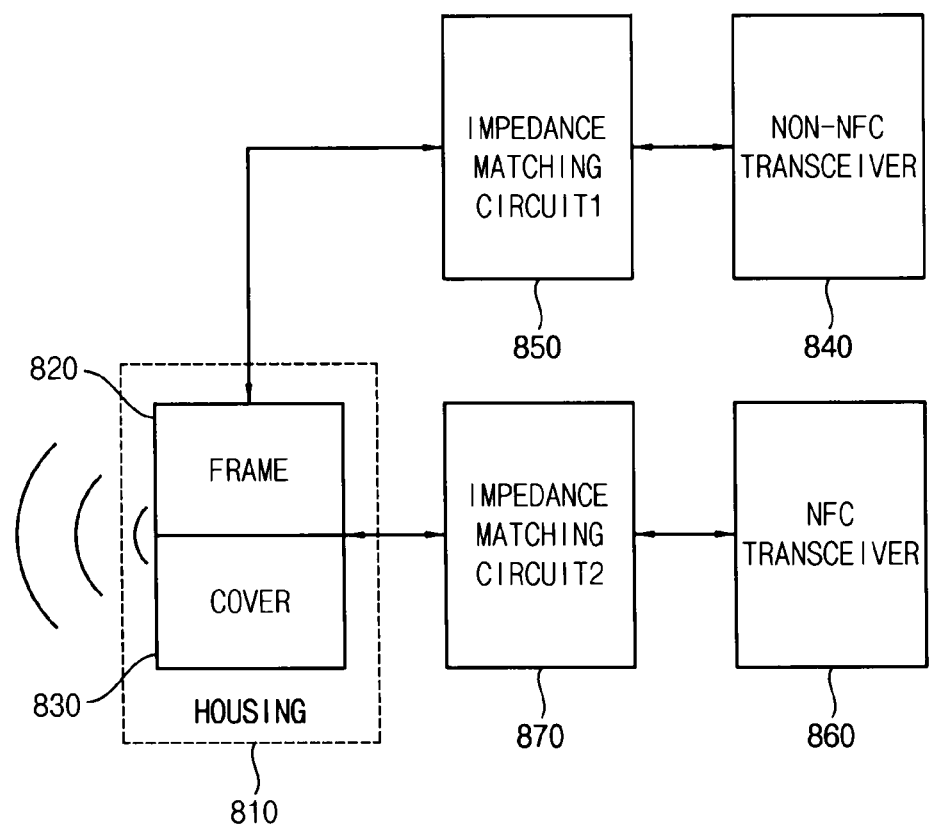
FIG. 9 is a block diagram illustrating a near field communication (NFC) transceiver and a non-near field communication transceiver that are coupled to a housing of a mobile device according to an example embodiment.

FIG. 9 is a block diagram illustrating a near field communication (NFC) transceiver and a non-near field communication transceiver that are coupled to a housing of a mobile device according to an example embodiment.

Referring to FIG. 9, a non-NFC transceiver 840 installed within a housing 810 of a mobile device may transmit or receive a non-NFC signal using a frame 820 defining a perimeter of the mobile device as an antenna for a non-NFC (e.g., LTE, WCDMA, WLAN, GPS, Bluetooth, etc.). Further, an NFC transceiver 860 installed within the housing 810 of the mobile device may transmit or receive an NFC signal using at least a portion of the frame 820 and at least a portion of the cover 830 as an antenna for an NFC.

In some example embodiments, the non-NFC transceiver 840 may be coupled to the frame 820 through a first impedance matching circuit 850 that performs impedance matching between the frame 820 and the non-NFC transceiver 840. Further, the NFC transceiver 860 may be coupled to the housing 810 through a second impedance matching circuit 870 that performs impedance matching between the housing 810 and the NFC transceiver 860.

As described above, the non-NFC transceiver 840 and the NFC transceiver 860 may use the housing 810 of the mobile device as antennas for the non-NFC and the NFC, respectively. Accordingly, although the housing 810 of the mobile device is formed of a metal material, the mobile device may accurately perform the non-NFC and the NFC without signal distortion. Because dedicated antennas for the non-NFC and the NFC may be removed or reduced, the size and the cost of the mobile device may be reduced.

Figure 10:
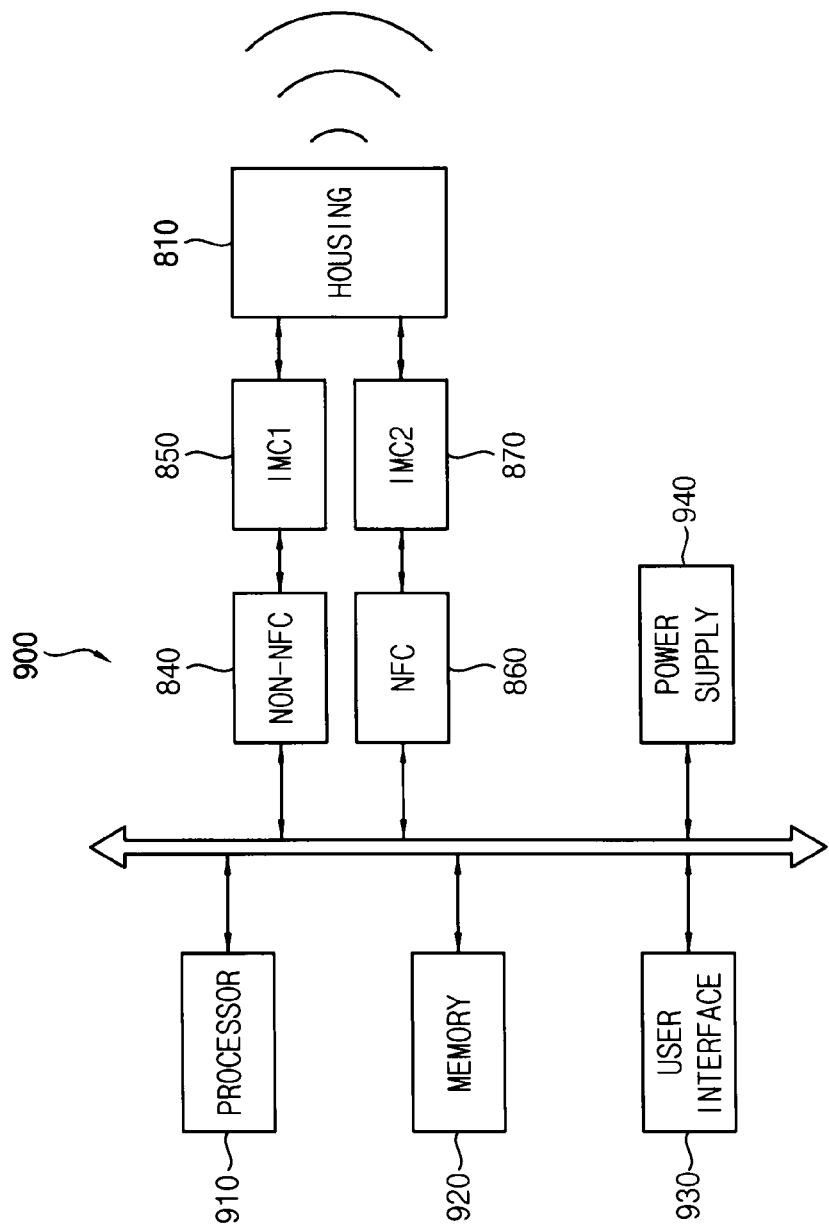
FIG. 10 is a block diagram illustrating a mobile device according to an example embodiment.

FIG. 10 is a block diagram illustrating a mobile device according to an example embodiment.

Referring to FIG. 10, a mobile device 900 includes a processor 910, a memory device 920, a user interface 930, a power supply 940, a non-NFC transceiver 840, a first impedance matching circuit 850, an NFC transceiver 860, a second impedance matching circuit 870 and a housing 810. According to example embodiments, the mobile device 900 may be any mobile device, for example, a cellular phone, a smart phone, a wearable device, a tablet computer, a laptop computer, a personal digital assistant (PDA), a portable multimedia player (PMP), a digital camera, a music player, a portable game console, a navigation device, etc.

The processor 910 may control an overall operation of the mobile device 900. In some example embodiments, the processor 910 may be an application processor (AP) that executes applications, for example, an internet browsing application, a game application, a video player application, etc. In some example embodiments, the processor 910 may be a single core processor. In other example embodiments, the processor 910 may be a multi-core processor including a plurality of processor cores. For example, the processor 910 may be a dual-core processor, a quad-core processor, a hexa-core processor, etc.

The memory device 920 may store data for an operation of the mobile device 900. For example, the memory device 920 may store a boot image for booting the mobile device 900, and/or may store data received from an external device. For example, the memory device 920 may be implemented as a volatile memory device (e.g., a dynamic random access memory (DRAM), a static random access memory (SRAM), a mobile DRAM, a DDR SDRAM, an LPDDR SDRAM, a GDDER SDRAM, an RDRAM, etc.), or may be implemented as a nonvolatile memory device (e.g., an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc.).

The non-NFC transceiver 840 may be coupled to the housing 810 through the first impedance matching circuit 850, and the NFC transceiver 860 may be coupled to the housing 810 through the second impedance matching circuit 870. The non-NFC transceiver 840 may perform the non-NFC using a frame of the housing 810 as an antenna. Further, the NFC transceiver 860 may perform an NFC using at least a portion of the frame and at least a portion of a cover of the housing 810 as an antenna. Accordingly, although the housing 810 of the mobile device 900 is formed of a metal material, the mobile device 900 may accurately perform the non-NFC and the NFC without signal distortion. Because dedicated antennas for the non-NFC and the NFC may be removed or reduced, the size and the cost of the mobile device 900 may be reduced.

The user interface 930 may include at least one input device (e.g., a keyboard, a mouse, a touch screen, etc., and at least one output device, a printer, a display device, etc.). The power supply 940 may supply power to the mobile device 900.

In some example embodiments, the mobile device 900 may further include an image processor, and may further include a storage device, such as a memory card, a solid state drive (SSD), a hard disk drive (HDD), a CD-ROM, etc.

In some example embodiments, the mobile device 900 and/or components of the mobile device 900 may be packaged in various forms, for example, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP), etc.

As described above, the housing 810 of the mobile device 900 may be used as the antennas by itself. Accordingly, the size of the mobile device 900 may be reduced, and the manufacturing cost of the mobile device 900 may be reduced.

The inventive concepts may be applied to any mobile device, including but not limited to a cellular phone, a smart phone, a wearable device, a tablet computer, a laptop computer, a personal digital assistant (PDA), a portable multimedia player (PMP), a digital camera, a music player, a portable game console, a navigation device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A housing of a mobile device, comprising:
    a frame defining a perimeter of the mobile device, the frame including a first metal material, and configured to operate as a first antenna for a first wireless communication; and
    a cover configured to cover at least one surface of the mobile device, the cover including a second metal material, and the cover and at least a portion of the frame configured to form a signal path such that the cover and the at least the portion of the frame are configured to operate as a second antenna for a second wireless communication.

2. The housing of claim 1, wherein a frequency band used in the first wireless communication is different from a frequency band used in the second wireless communication.

3. The housing of claim 1, wherein the first wireless communication is a non-near field communication, and the second wireless communication is a near field communication.

4. A housing of a mobile device comprising:
    a frame defining a perimeter of the mobile device, the frame including a first metal material and configured to operate as a first antenna for a first wireless communication, the frame including,
        a metal structure defining the perimeter of the mobile device, and having a slit defined therein at one side of the mobile device,
        an insulator in the slit, and
        a first terminal coupled to the metal structure and being adjacent to the insulator, and
    a cover configured to cover at least one surface of the mobile device, the cover including a second metal material, and the cover and at least a portion of the frame configured to operate as a second antenna for a second wireless communication, the cover including,
        a metal region,
        an insulating region being adjacent to the one side of the mobile device, and
        a second terminal on the metal region, the second terminal being adjacent to the insulating region such that the insulating region is between the first terminal and the second terminal.

5. The housing of claim 4, wherein the housing is configured to perform the second wireless communication by using a signal path formed around the insulating region.

6. The housing of claim 5, wherein the signal path is provided along the first terminal, a portion of the metal structure, a portion of the metal region and the second terminal.

7. The housing of claim 5, where the cover further includes a magnetic sheet on at least a portion of the signal path.

8. The housing of claim 5, wherein the frame further includes:
    at least one inductor or at least one low pass filter at the signal path.

9. A housing of a mobile device, comprising:
    a frame defining a perimeter of the mobile device, the frame including a first metal material and configured to operate as a first antenna for a first wireless communication, the frame including,
        a metal structure defining the perimeter of the mobile device, the metal structure being divided into first through third regions by first and second slits, the first slit between the first region and the second region, and the second slit between the second region and the third region,
        a first inductor at the first slit, the first inductor having a first end and a second end, the second end coupled to the second region of the metal structure,
        a second inductor at the second slit, the second inductor having a third end and a fourth end, the third end coupled to the second region of the metal structure, and the fourth end coupled to the third region of the metal structure, and
        a first terminal coupled to the first end of the first inductor; and
    a cover configured to cover at least one surface of the mobile device, the cover including a second metal material, and the cover and at least a portion of the frame configured to operate as a second antenna for a second wireless communication.

10. The housing of claim 9, wherein the cover includes,
a metal region,
an insulating region adjacent to an one side of the mobile device, and
a second terminal on the metal region, the second terminal being adjacent to the insulating region such that the insulating region is between the first terminal and the second terminal.

11. The housing of claim 10, wherein the housing is configured to perform the second wireless communication by using a signal path provided along the first terminal, the first inductor, the second region of the metal structure, the second inductor, the third region of the metal structure, a portion of the metal region and the second terminal.

12. A housing of a mobile device, comprising:
a frame defining a perimeter of the mobile device, the frame including a first metal material and configured to operate as a first antenna for a first wireless communication, the frame including,
a metal structure defining the perimeter of the mobile device, the metal structure being divided into first through third regions by first and second slits, the first slit between the first region and the second region, and the second slit between the second region and the third region,
a first low pass filter at the first slit, the first low pass filter having a first end and a second end, and a second end coupled to the second region of the metal structure,
a second low pass filter at the second slit, the second low pass filter having a third end and a fourth end, the third end coupled to the second region of the metal structure, and the fourth end coupled to the third region of the metal structure, and
a first terminal coupled to the first end of the first low pass filter; and
a cover configured to cover at least one surface of the mobile device, the cover including a second metal material, and the cover and at least a portion of the frame configured to operate as a second antenna for a second wireless communication.

13. The housing of claim 12, wherein the cover includes,
a metal region,
an insulating region adjacent to an one side of the mobile device and
a second terminal on the metal region, the second terminal being adjacent to the insulating region such that the insulating region is between the first terminal and the second terminal.

14. The housing of claim 13, wherein the housing is configured to perform the second wireless communication by using a signal path provided along the first terminal, the first low pass filter, the second region of the metal structure, the second low pass filter, the third region of the metal structure, a portion of the metal region and the second terminal.

15. The housing of claim 12, wherein the first low pass filter includes,
a first inductor having one end coupled to the first terminal and another end coupled to the second region of the metal structure, and
a first capacitor having one end coupled to the first terminal and another end coupled to a ground voltage, and
wherein the second low pass filter includes,
a second inductor having one end coupled to the second region of the metal structure and another end coupled to the third region of the metal structure, and
a second capacitor having one end coupled to the third region of the metal structure and another end coupled to the ground voltage.

16. A housing of a mobile device, comprising:
a frame defining at least a part of a perimeter of the mobile device, the frame including a metal structure, the frame configured to operate as a first antenna for a first wireless communication;
a first terminal electrically connected to the metal structure of the frame; and
a cover covered by the frame and configured to cover at least one surface of the mobile device, the cover including a metal region, an insulating region and a second terminal, the first terminal on the insulating region, the second terminal in the metal region adjacent to the first terminal, at least a portion of the cover and at least a portion of the frame configured to form a signal path between the first and second terminals to operate as a second antenna for a second wireless communication, the second wireless communication having a range shorter than the first wireless communication.

17. The housing of a mobile device of claim 16, wherein the frame includes at least one slit defined therein, and one of at least one inductor and at least one low pass filter is provided in the at least one slit.

18. The housing of a mobile device of claim 16, wherein the cover further includes a magnetic sheet, and the magnetic sheet is on at least a portion of a signal path of the relatively short range wireless communication.

19. The housing of a mobile device of claim 16, wherein the housing further includes a metal pattern on the insulating region, and the first terminal is on the metal pattern.

* * * * *